INVENTOR.
GENUNG L. CLAPPER
BY Sughrue, Rothwell, Mion & Zinn
ATTORNEYS

FIG. 2

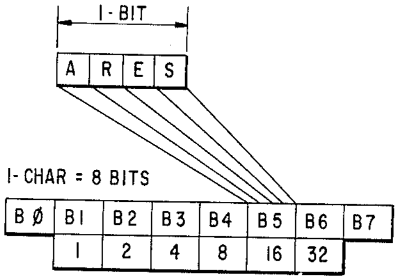

FIG. 6

EXAMPLES:

[111101 = 61] #1 [101000 = 40] #2

| | | TRIGGER | 13 | 14 | 15 | 16 | 17 | 18 | 19 | 31 | 32 | 13 | 14 | 15 | 16 | 17 | 18 | 19 | 31 | 32 |
|---|---|---|---|---|---|---|---|---|---|---|---|---|---|---|---|---|---|---|---|---|
| | | | 1 | 2 | 4 | 8 | 10 | 20 | 40 | 6 | 12 | 1 | 2 | 4 | 8 | 10 | 20 | 40 | 6 | 12 |
| B Ø | S | RESET ACCUMULATOR | Ø | Ø | Ø | Ø | Ø | Ø | Ø | Ø | Ø | Ø | Ø | Ø | Ø | Ø | Ø | Ø | Ø | Ø |
| B 1 | S | SAMPLE [1] | 1 | Ø | Ø | Ø | Ø | Ø | Ø | Ø | Ø | Ø | Ø | Ø | Ø | Ø | Ø | Ø | Ø | Ø |
| B 2 | S | SAMPLE [2] | 1 | Ø | Ø | Ø | Ø | Ø | Ø | Ø | Ø | Ø | Ø | Ø | Ø | Ø | Ø | Ø | Ø | Ø |
| B 3 | S | SAMPLE [4] | 1 | Ø | 1 | Ø | Ø | Ø | Ø | Ø | Ø | Ø | Ø | Ø | Ø | Ø | Ø | Ø | Ø | Ø |
| B 4 | S | SAMPLE [8] 8(4+2)=6 | 1 | Ø | 1 | 1 | Ø | Ø | Ø | 1 | Ø | Ø | Ø | Ø | 1 | Ø | Ø | Ø | Ø | Ø |
| B 5 | A | ADD [4] (EX#1) | 1 | Ø | Ø | Ø | 1 | Ø | Ø | 1 | Ø | Ø | Ø | Ø | 1 | Ø | Ø | Ø | Ø | Ø |
| B 5 | R | ADD [2] (EX#1) | 1 | 1 | Ø | Ø | 1 | Ø | Ø | 1 | Ø | Ø | Ø | Ø | 1 | Ø | Ø | Ø | Ø | Ø |
| B 5 | E | TURN OFF CORRECTION | 1 | 1 | Ø | Ø | 1 | Ø | Ø | Ø | Ø | Ø | Ø | Ø | 1 | Ø | Ø | Ø | Ø | Ø |
| B 5 | S | SAMPLE [16] = 10 + 6 | 1 | 1 | Ø | Ø | Ø | 1 | Ø | 1 | Ø | Ø | Ø | Ø | 1 | Ø | Ø | Ø | Ø | Ø |
| B 6 | A | ADD [4] (EX#1) | 1 | 1 | 1 | Ø | Ø | 1 | Ø | 1 | Ø | Ø | Ø | Ø | 1 | Ø | Ø | Ø | Ø | Ø |
| B 6 | R | ADD [2] (EX#1) | 1 | Ø | Ø | 1 | Ø | 1 | Ø | 1 | Ø | Ø | Ø | Ø | 1 | Ø | Ø | Ø | Ø | Ø |
| B 6 | E | TURN OFF CORRECTION | 1 | Ø | Ø | 1 | Ø | 1 | Ø | Ø | Ø | Ø | Ø | Ø | 1 | Ø | Ø | Ø | Ø | Ø |
| B 6 | S | SAMPLE [32] = 20 + 12 | 1 | Ø | Ø | 1 | Ø | Ø | 1 | Ø | 1 | Ø | Ø | Ø | 1 | Ø | 1 | Ø | Ø | 1 |
| B 7 | A | ADD [10] (EX#1&#2) | 1 | Ø | Ø | 1 | 1 | Ø | 1 | Ø | 1 | Ø | Ø | Ø | 1 | 1 | 1 | Ø | Ø | 1 |
| B 7 | R | ADD [2] (EX#1&#2) | 1 | 1 | Ø | 1 | 1 | Ø | 1 | Ø | 1 | Ø | 1 | Ø | 1 | 1 | 1 | Ø | Ø | 1 |
| B 7 | E | TURN OFF CORRECTION | 1 | 1 | Ø | 1 | 1 | Ø | 1 | Ø | Ø | Ø | 1 | Ø | 1 | 1 | 1 | Ø | Ø | Ø |
| B 7 | S | SAMPLE 8(4+2) = 6 | 1 | 1 | Ø | 1 | 1 | Ø | 1 | 1 | Ø | Ø | 1 | Ø | 1 | 1 | 1 | Ø | 1 | Ø |
| B Ø | A | ADD [4] (EX#1 &#2) | 1 | 1 | 1 | 1 | 1 | Ø | 1 | 1 | Ø | Ø | 1 | 1 | 1 | 1 | 1 | Ø | 1 | Ø |
| B Ø | R | ADD [2] (EX#1&#2) | 1 | Ø | Ø | Ø | Ø | 1 | 1 | 1 | Ø | Ø | Ø | Ø | Ø | Ø | Ø | 1 | 1 | Ø |
| B Ø | E | TURN OFF CORRECTION | 1 | Ø | Ø | Ø | Ø | 1 | 1 | Ø | Ø | Ø | Ø | Ø | Ø | Ø | Ø | 1 | Ø | Ø |
| | | | UNITS | | | | TENS | | | | | UNITS | | | | TENS | | | | |

3,228,022
Patented Jan. 4, 1966

3,228,022

CONVERSION SYSTEM

Genung L. Clapper, Vestal, N.Y., assignor to International Business Machines Corporation, New York, N.Y., a corporation of New York Filed Oct. 31, 1961, Ser. No. 148,956
6 Claims. (Cl. 340—347)

This invention relates to conversion systems and more particularly to a system for performing a high speed conversion from a binary input code to a binary coded decimal output.

In many data processing systems it is necessary to convert from a binary code to binary coded decimal. In many such systems, the binary information is a serial train of bits with a specified number of bits making up each character. In such systems it is desirable to transform the binary bits to binary coded decimal bit-by-bit so that after reception of the number of bits making up each character, the character is completely translated to binary coded decimal and no further time is required for translation. The converter is then in a condition to immediately receive the first bit of the next character and proceed with the translation of the second character.

Accordingly, it is an object of the present invention to provide an improved high speed binary to binary-coded decimal conversion system.

It is another object of the present invention to provide a conversion system in which binary coded input characters are translated bit-by-bit to binary coded decimal so that the conversion process is complete when the last bit of each character has been received.

In accordance with one embodiment of the invention, each of the binary input bits is sampled and inserted into an associated one of a plurality of triggers which make up a register and accumulator. Gating circuitry is provided for sampling the conditions of the triggers in the accumulator and for setting two correction triggers in accordance with the received bits and the conditions of the accumulator triggers. The outputs of the correction triggers are also sensed by gating circuitry and this gating circuitry sets the triggers in the register and accumulator so that the count standing in the register corresponds in binary coded decimal output to the binary code of the input character.

The foregoing and other objects, features and advantages of the invention will be apparent from the following more particular description of a preferred embodiment of the invention as illustrated in the accompanying drawings, in which:

FIGURE 1*a* is a block symbol and circuit for an emitter-follower;

FIGURE 1*b* is a block symbol and circuit for an inverter;

FIGURE 1*c* is a block symbol and circuit for an AND gate;

FIGURE 1*d* is a block symbol and circuit for an AND-inverter;

FIGURE 1*e* is a block symbol and circuit for a differentiator;

FIGURE 1*f* is a block symbol and circuit for a binary trigger;

FIGURE 2 is a diagram of bit make-up of each character;

FIGURE 3*a* is a block diagram of the clock system for the converter;

FIGURE 3*b* is a circuit diagram of the oscillator and frequency divider used in the clock system;

FIGURE 3*c* is a circuit diagram of the four-stage ring used in the clock system;

FIGURE 3*d* is a circuit diagram of the pulse generator used in the clock system;

FIGURE 3*e* is a circuit diagram of the ring stage driver;

FIGURE 6 is a table showing two examples of operation of the converter.

*Circuits used*

Figure 1A:
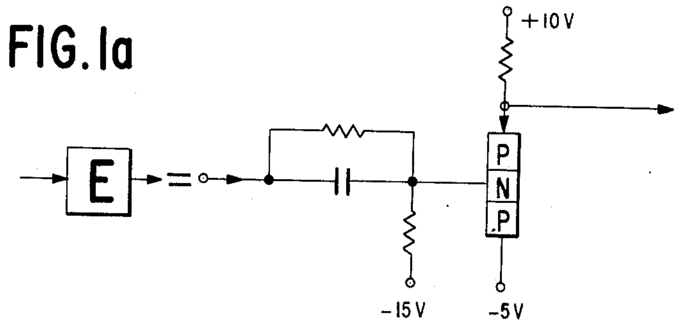

Before proceeding with the description of the converter itself, circuits used in the converter, and shown in block form, will be briefly described. It will, of course, be understood that numerous circuits may be used in the converter and the circuits shown form no part of this invention. FIGURE 1*a* shows the block symbol used for an emitter-follower and an emitter-follower circuit which may be used. When the input to the emitter-follower is "up" the output is "up" and when the input is "down," the output is "down."

Figure 1B:
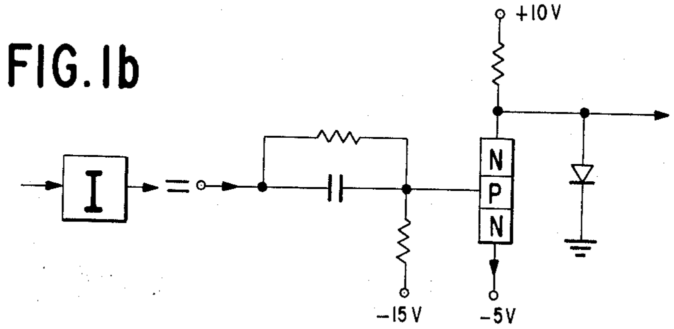

FIGURE 1*b* shows the block symbol used for an inverter and a suitable inverter circuit. When the input to the inverter is "up" the output is "down" and when the input is "down" the output is "up."

Figure 1C:
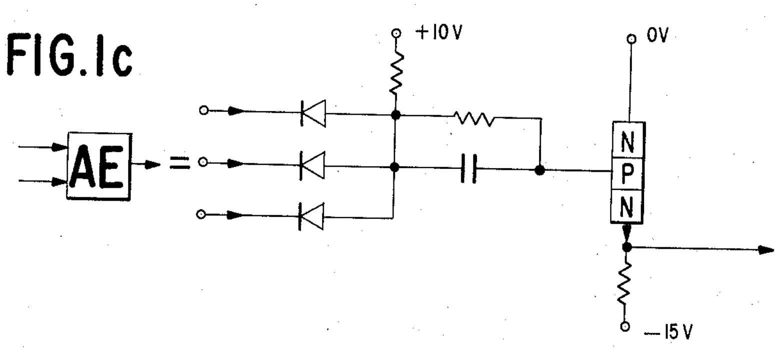

FIGURE 1*c* shows the block symbol used for an AND gate with an emitter-follower output and a suitable AND circuit. When all inputs to the AND gate are "up," the output is "up." When one or more inputs to the AND gate are "down," the output is "down."

Figure 1D:
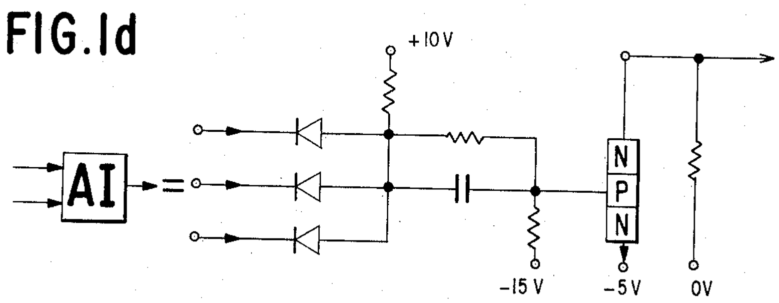

FIGURE 1*d* shows the block symbol used for an AND gate with an inverter on the output and a suitable AND-inverter circuit. When all inputs to the AND-inverter are "up," the output is "down." When one or more inputs are "down," the output is "up." AND circuits with emitter-follower outputs or inverter outputs are used to perform most of the switching.

Figures 1E, 1F:
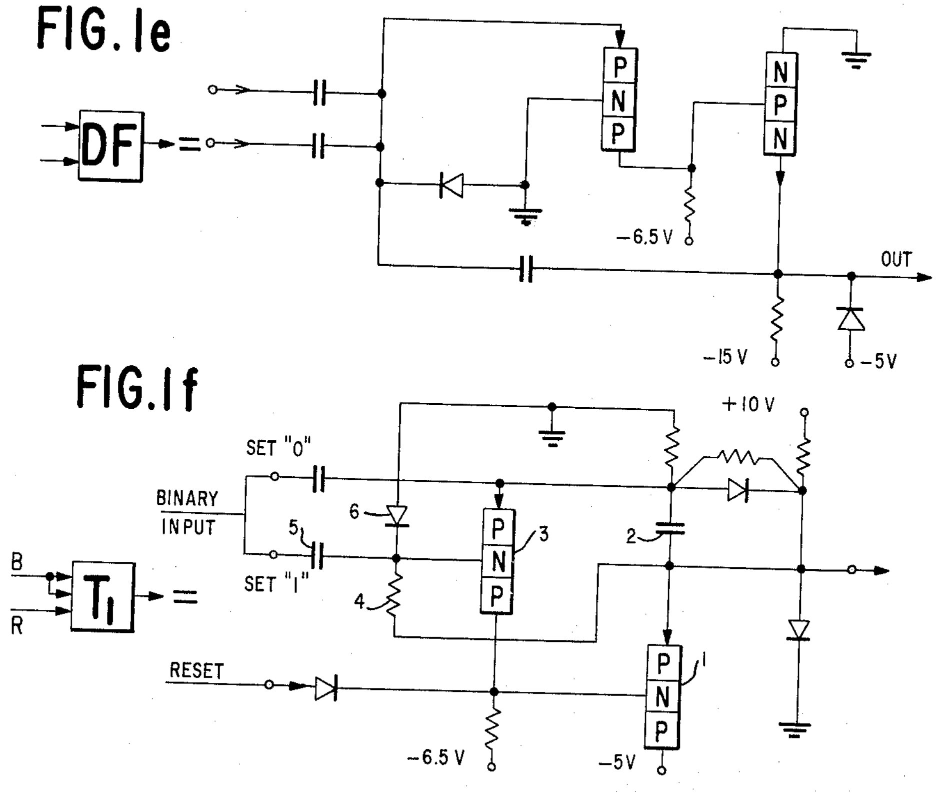

FIGURE 1*e* shows the block symbol of a differentiator and mixer circuit and suitable circuitry. The details of this differentiator and mixer circuit are shown in U.S. Patent 2,975,303 to the present inventor and assigned to the assignee of the present invention. Briefly, the differentiator and mixer circuit produces an output pulse of a type suitable for triggering a flip-flop whenever any one of the input lines goes from a "down" voltage condition to an "up" voltage condition.

The block symbol used for a binary trigger circuit and a suitable trigger circuit are shown in FIGURE 1*f*. A pulse to the input labeled R resets the flip-flop to its "off" or 0 condition. Pulses at the input labeled B change the condition of the trigger alternately between the "on" and "off" condition. The output derived is the complementary output. That is, this output is "up" when the trigger is reset to the 0 condition and is "down" when the trigger is set to the 1 condition.

Referring particularly to the trigger circuit, the operation is briefly as follows. When a positive pulse is applied to the reset line the transistor 1 is turned "off." Pulses at the binary input switch the condition of the trigger. The capacitor 2 connected between the output and the emitter of transistor 3 provides the memory for binary operation. The capacitor 2 also provides feedback which effectively gates the set 0 input. Resistor 4 provides feedback to the base of transistor 3 to control the recovery time of the set 1 input capacitor 5. Diode 6 and the PN junction of transistor 3 conduct alternately to effectively gate the input pulses by changing the time constants at the base and emitter of transistor 3. The trigger circuit provides high speed operation of approximately 1000 kc. without the necessity of external gates.

*Clock system*

Figure 3A:
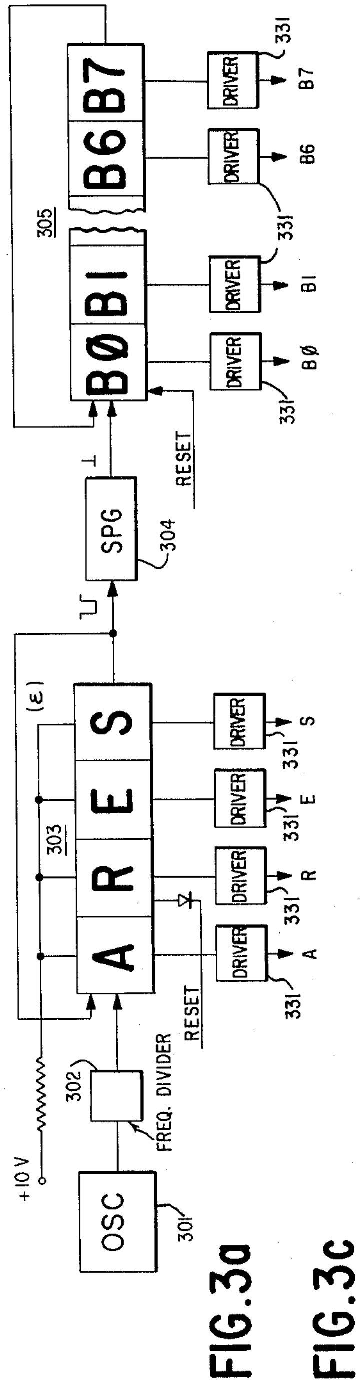

As shown in FIGURE 2, each serial input character to the converter includes a switch bit $B_0$, six binary number bits $B_1$–$B_6$ and a control bit $B_7$. Clock pulses are generated corresponding in time to each of the input bit times and these clock pulses are designated $B_0$–$B_7$. In addition, each of the binary bit times is divided into four intervals which are designated A, R, E and S. Timing pulses are generated for each of these intervals and the timing pulses are designated A, R, E and S pulses. The clock system for generating these clock pulses is shown in FIGURES 3*a*–3*e*. Again, the clock system forms no part of the present invention but is merely included to complete the disclosure. Referring to FIGURE 3*a*, a one-megacycle oscillator 301 provides the basic timing. This one-megacycle frequency is divided down by frequency divider 302 to produce a 500-kc. train of pulses which is fed to a four-stage ring counter 303. As the four-stage ring counter 303 steps through each of its stages, the A, R, E and S pulses are produced at the outputs of the ring stages. The output of the fourth S stage is connected back to the input of the four-stage ring 303 and is also connected to the special pulse generator 304. This pulse generator produces a train of pulses which drives an eight-stage ring counter 305. As the eight-stage ring circuit 305 steps through each of its stages the bit timing pulses $B_0$–$B_7$ are produced.

Figure 3C:
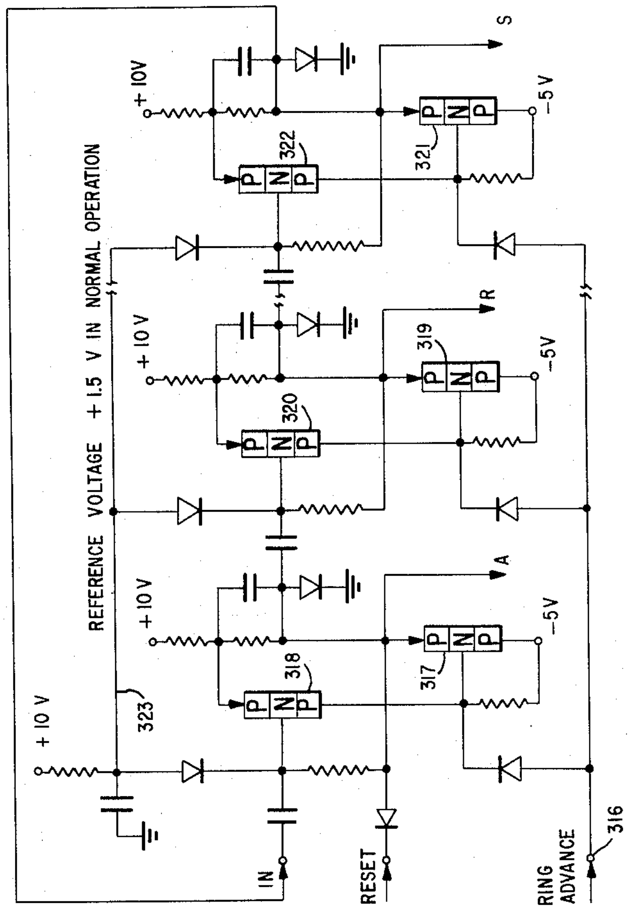
Figure 3D:
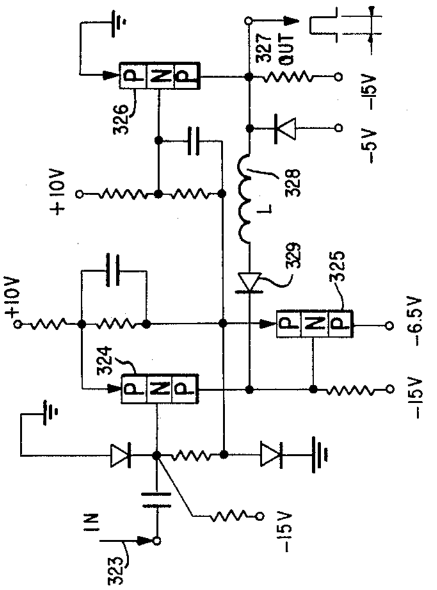
Figures 3B, 3E:
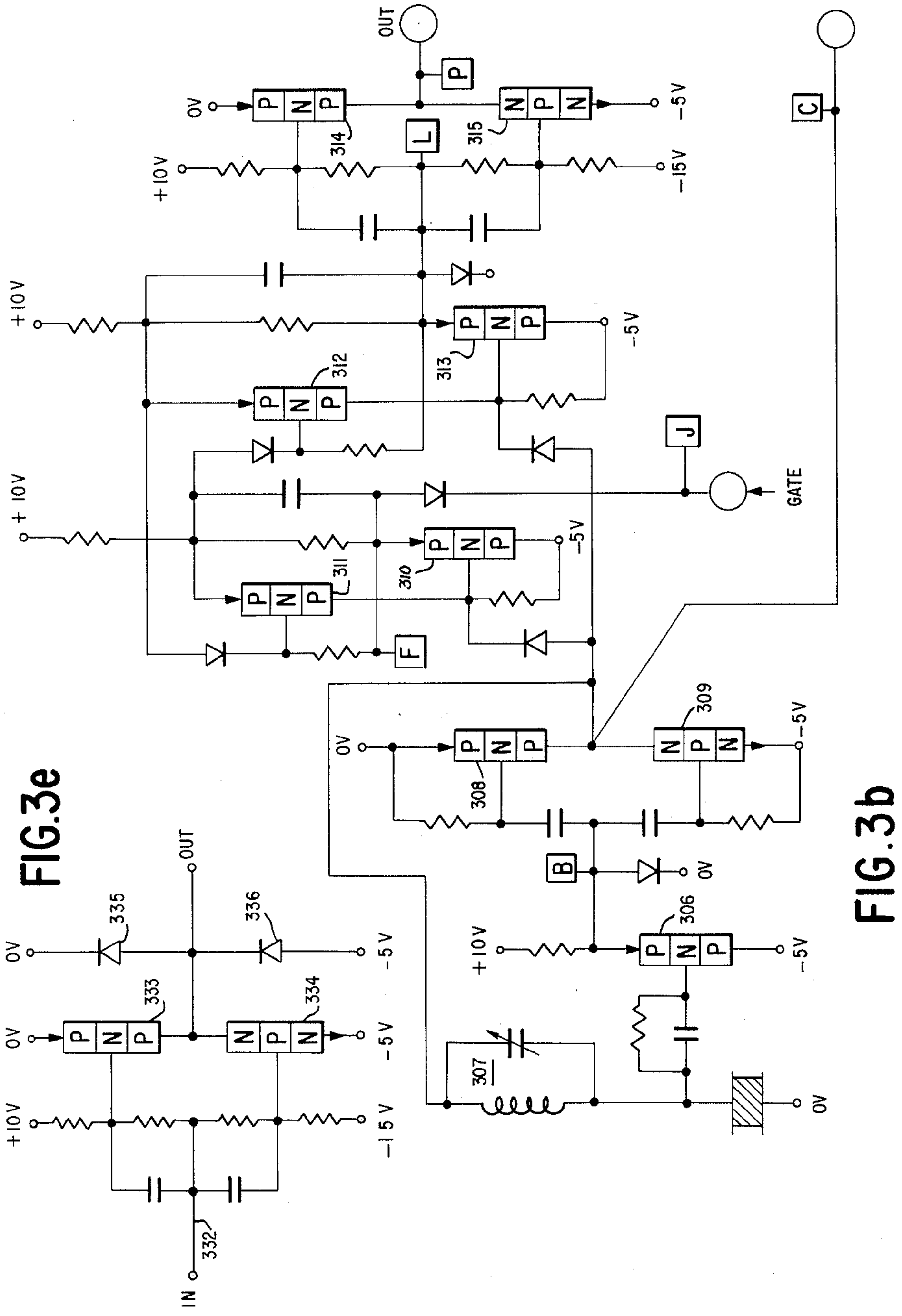

Referring to FIGURE 3*b*, the details of the one-megacycle oscillator 301 are shown. Transistor 306 is an emitter-follower which takes a small amount of power from the tank circuit 307 and converts it to a low impedance clipped output with sufficient power to drive the complementary inverter driver including transistors 308 and 309. This furnishes an inverted output with rise and fall times of less than 0.1 microsecond. The output is fed back to drive the tank circuit 307. The operation of this oscillator is described in greater detail in U.S. Patent 2,851,604 to the present inventor and assigned to the assignee of the present application.

The output of the one-megacycle oscillator is connected to a frequency divider including transistors 310, 311, 312 and 313. This frequency divider produces a 500-kc. output through output transistors 314 and 315.

The output of frequency divider 302 is connected to the four-stage ring, the details of which are shown in FIGURE 3*c*. Only the first, second and fourth stages of the transistor ring are shown. Pulses from the frequency divider 302 are connected over the ring advance lead 316 to drive the ring. This ring is of the high-speed type that is interlocked so that only one stage is on at a time. Transistors 317 and 318 make up the first stage which produces the A pulse; transistors 319 and 320 make up the second stage which produces the R pulse; and transistors 321 and 322 make up the fourth stage which produces the S pulse. All stages are interlocked by the common connection 323 which is maintained, for example, at a reference voltage of +1.5 volts. This reference voltage is maintained as long as one and only one trigger is "on." Any attempt to turn on two triggers causes the reference voltage to drop; consequently one of the triggers is turned off. Each successive advance pulse turns on a succeeding trigger stage and this causes the previously turned on stage to be turned off.

The output of the fourth stage of the four-stage ring 303, the S pulse, is connected to special pulse generator 304. The circuitry for a suitable pulse generator 304 is shown in FIGURE 3*d*. The pulse at the input 323 causes a voltage rise at the base of transistor 324 which cuts off transistor 324 and produces a voltage drop at the base of transistor 325. Transistor 325 is turned on and the negative pulse at the emitter of transistor 325 is inverted in transistor 326 to produce a positive pulse at the output 327. After a period of time determined by the value of inductance 328, the voltage at the anode 329 goes positive and this is coupled to the base of transistor 325 to terminate the pulse. A better understanding of the details of operation of this special pulse generator may be obtained in U.S. Patent 2,842,683 to the inventor of the present application and assigned to the assignee of the present application.

The output of the special pulse generator 304 is connected to advance the eight-stage ring 305. The details of this ring are similar to the details of the four-stage ring shown in FIGURE 3*c*.

Referring to FIGURE 3*e* there are shown the details of each of the drivers 331 (FIGURE 3*a*) which provide the outputs from each of the ring stages. The output of each ring is connected over input 332 to the bases of transistors 333 and 334. The common collectors of transistors 333 and 334 provide an output pulse which is clamped between suitable levels by diodes 335 and 336.

*Converter*

Figure 4:
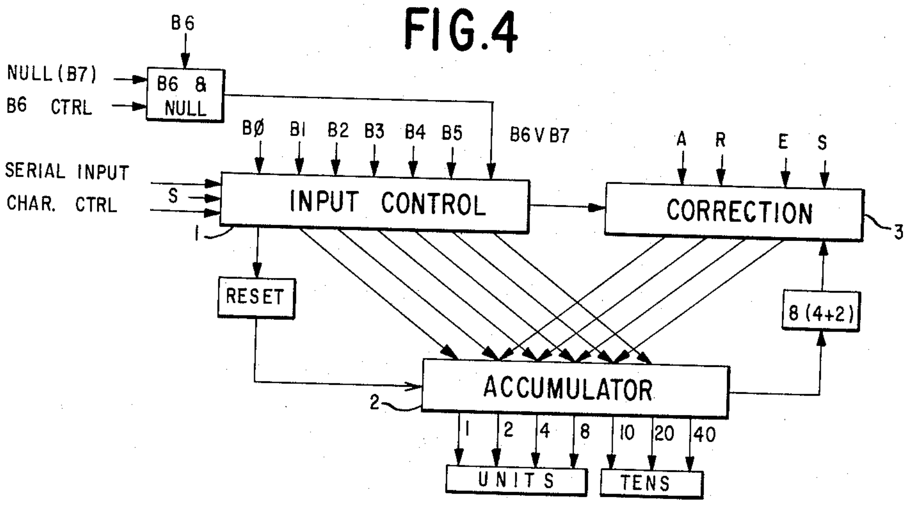
FIGURE 4 is a block diagram of the converter.

Referring now to FIGURE 4 which shows a block diagram of the converter, the binary number enters the input control 1 under control of a sampling pulse S and a CHARACTER CONTROL gate. Each of the six bits making up the binary number are gated to an associated trigger in the accumulator 2 under control of the bit pulses $B_1$, $B_2$, $B_3$, $B_4$, $B_5$ and $B_6$. The $B_0$ bit is used to reset all of the trigger stages in the accumulator 2. The A, R, E and S pulses are applied to correction circuitry 3 to correct the conditions of the triggers in accumulator 2 so that these triggers represent the input character in binary coded decimal form.

Figure 5:
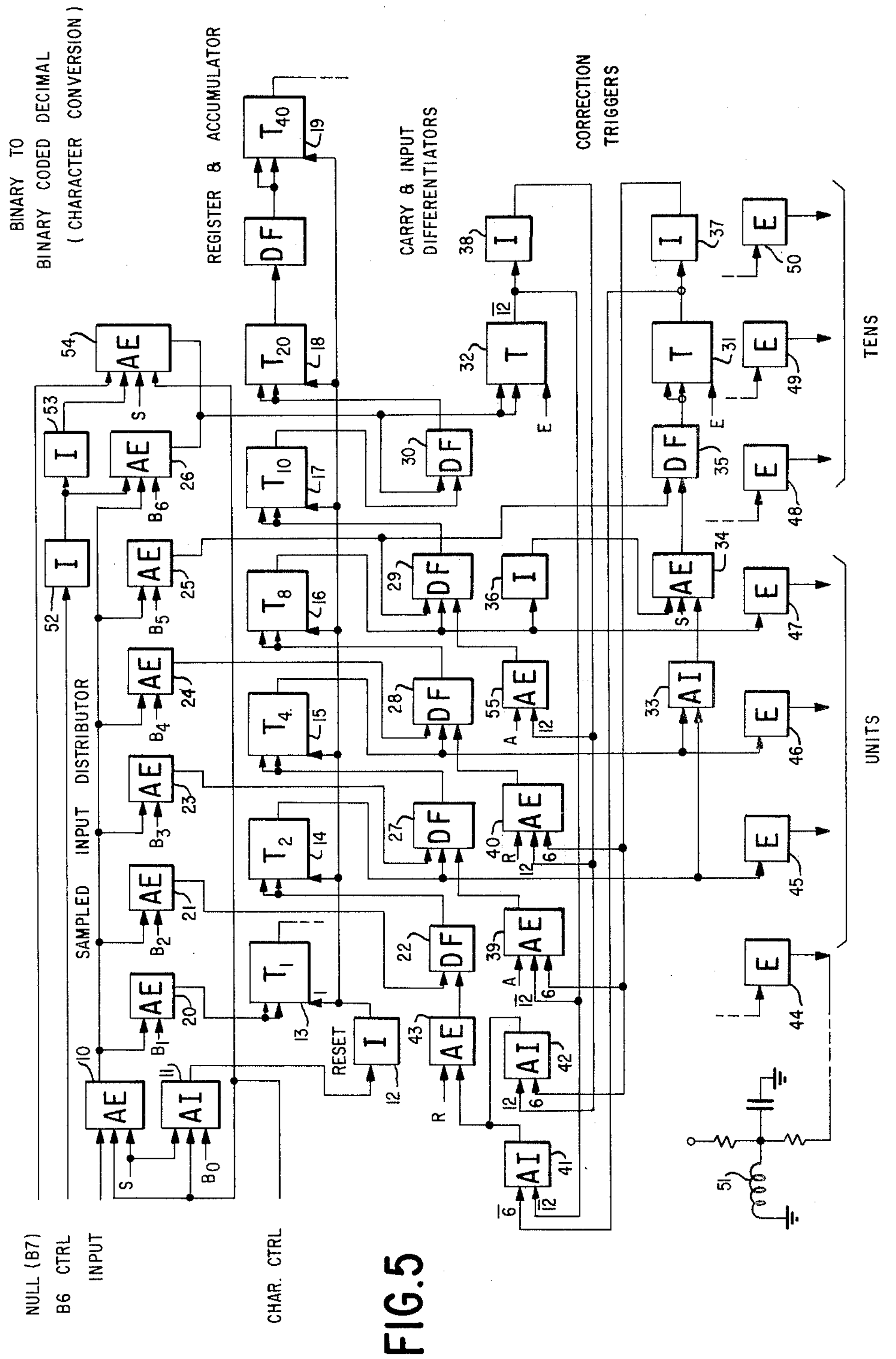
FIGURE 5 shows a logical diagram of the converter.

A better understanding of the invention may be obtained by reference to the more detailed block diagram, FIGURE 5. Input characters are applied to AND gate 10 and "1" bits will be passed through AND gate 10 when the CHARACTER CONTROL signal and the S pulse are present. The $B_0$ timing pulse acts, in conjunction with CHARACTER CONTROL and the S pulse, through AND-inverter 11 and inverter 12 to reset the register and accumulator triggers 13–19. The $B_1$ timing pulse acts through AND gate 20 to set the first input bit into trigger 13. If the first input bit is a "1," the trigger 13 will be set. During the second bit interval, the $B_2$ timing pulse acts through AND gate 21 and the differentiator mixer circuit 22 to set the second input bit into trigger 14. Similarly, sequential timing pulses $B_3$, $B_4$, $B_5$, $B_6$ act through AND gates 23–26 and through differentiator mixer circuits 27–30 to set the third, fourth, fifth and sixth binary input bits into triggers 15–18, respectively.

Correction triggers 31 and 32 are provided to correct the binary count standing in the register and accumulator to a binary coded decimal value. These triggers are set by gating circuitry including AND-inverter 33, AND gate 34, differentiator mixer 35 and inverter 36. The settings of correction triggers 31 and 32 are sensed and corrections applied to the register and accumulator by gating circuitry including inverters 37 and 38, AND gates 39 and 40, AND-inverters 41 and 42 and AND gates 43 and 55. These circuits are coupled together in a manner that produces an "exclusive OR" function.

After the register and accumulator has been corrected, the count standing in triggers 13–19 represents the binary coded decimal value of the binary input. This count is connected to emitter-followers 44–50. Each of these emitter-followers receives its input from a corresponding one of the triggers 13–19. The connections between trigger 14 and emitter-follower 45 and between trigger 15 and emitter-follower 46 have been shown, while others are shown as being unconnected; it will be understood that these other emitter-followers are connected to corresponding triggers. The final output of the converter may be in the form of relay circuitry; the relays are driven by emitter-followers 44–50. Emitter-follower 44 is shown connected to the relay winding 51 as an example.

Provision is made for eliminating the sixth bit from the input when this bit is used for redundancy check purposes. This is done in response to a $B_6$ CONTROL signal which is inverted in inverter 52 and controls AND gate 26 associated with the $B_6$ timing pulse. The $B_6$ CONTROL signal is inverted again in inverter 53 and is applied to AND gate 54. This signal, together with a NULL signal coming at $B_7$ time is applied to AND gate 54. In this manner, the sixth bit of a NULL may be retained even though the $B_6$ CONTROL is used to eliminate the redundancy check bit.

The operation of the converter can best be explained in conjunction with an example as shown in FIGURE 6. In the first example, the binary input 111101, low order digit on right (decimal 61), is translated to the binary coded decimal 1000011, the first four positions from left to right being the units order, and the next three positions from left to right being the tens order, representing the decimal number 61. In the sequence chart of FIGURE 6 the bit times are shown vertically and the states of triggers 13–19 and correction triggers 31 and 32 are shown horizontally. Initially the CHARACTER CONTROL gate goes "up," and at $B_0$ time the S pulse passes through AND-inverter 11 and inverter 12 to reset all triggers to the 0 condition. At $B_1$ time the S pulse and the first input bit, which is a 1, act through AND gates 10 and 20 to set trigger 13 to the 1 condition. At $B_2$ time the S pulse does not pass through AND gates 10 and 21 to set trigger 14 since the second bit is a 0. At $B_3$ time the S pulse, in conjunction with the third bit, which is a 1, acts through AND gates 10 and 23 and differentiator 27 to set a 1 into trigger 15. At $B_4$ time the S pulse in conjunction with the fourth bit, which is a 1, acts through AND gates 10 and 24 and differentiator 28 to set a 1 into trigger 16. At $B_4$ time the S pulse also acts through AND gate 34 and differentiator 35 to set correction trigger 31 to the 1 condition.

At $B_5$ time the A pulse acts through AND gate 39 and differentiator 27 to set the trigger 15 to the 0 condition. The output from trigger 15 goes "up" and this is differentiated in differentiator mixer 28, the output of which sets trigger 16 to the 0 condition. The output of trigger 16 goes "up" and this acts through differentiator mixer 29 to set the trigger 17 to the 1 condition. At $B_5$ time the R pulse acts through AND gate 43 and differentiator 22 to set a 1 into trigger 14. At $B_5$ time the E pulse than resets correction trigger 31 to the 0 condition. Still at $B_5$ time the S pulse, in conjunction with the fifth bit, which is a 1, acts through AND gate 10, AND gate 25 and differentiator 29 to switch trigger 17 from the 1 to the 0 state. When this occurs, the output of trigger 17 goes "up" and this acts through differentiator 30 to switch trigger 18 from the 0 condition to the 1 condition. The S pulse at $B_5$ time also acts through AND gates 10 and 25 and differentiator 35 to set correction trigger 31 to the 1 condition.

At $B_6$ time, the A pulse acts through AND gate 39 and differentiator 27 to set a 1 into trigger 15. At $B_6$ time the R pulse acts through AND gate 43 and differentiator 22 to switch trigger 14 from the 1 to the 0 condition. When this occurs, the output of trigger 14 goes "up" and this acts through differentiator 27 to switch trigger 15 from the 1 to the 0 condition. When this occurs, the output of trigger 15 goes "up" and this acts through differentiator 28 to switch trigger 16 from the 0 to the 1 condition. At $B_6$ time the E pulse resets correction trigger 31. At $B_6$ time the S pulse, in conjunction with the sixth bit, which is a 1, acts through AND gates 10 and 26 and differentiator 30 to switch trigger 18 from the 1 to the 0 condition. When this occurs, the output of trigger 18 goes "up" and this switches trigger 19 from the 0 to the 1 condition. The S pulse at $B_6$ time also acts through AND gates 10 and 26 to set correction trigger 32 to the 1 condition.

At $B_7$ time, the A pulse acts through AND gate 55 and differentiator 29 to switch trigger 17 from the 0 to the 1 condition. At $B_7$ time, the R pulse acts through AND gate 43 and differentiator 22 to switch trigger 14 from the 0 to the 1 condition. At $B_7$ time, the E pulse resets correction trigger 32. At $B_7$ time, the S pulse acts through AND gate 34 and differentiator 35 to set correction trigger 31 to the 1 condition.

At $B_\phi$ time, the A pulse acts through AND gate 39 and differentiator 27 to set trigger 15 to the 1 condition. At $B_\phi$ time, the R pulse acts through AND gate 43 and differentiator 22 to switch trigger 14 from the 1 to the 0 condition. When this occurs, the output of trigger 14 goes "up" and this acts through differentiator 27 to switch trigger 15 from the 1 to the 0 condition. Similarly, the output of trigger 15 goes "up" and acts through differentiator 28 to switch trigger 16 from the 1 to the 0 condition. The output of trigger 16 then goes "up" and acts through differentiator 29 to switch trigger 17 from the 1 to the 0 condition. Finally, the output of trigger 17 goes "up" and acts through differentiator 30 to switch trigger 18 from the 0 to the 1 condition. At $B\phi$ time, the E pulse resets correction trigger 31. The count standing in triggers 10–19 is now 1000011, the binary coded decimal representation of the binary input 61.

The first example just described was chosen to illustrate the greatest number of correction cycles. Example 2 is chosen to illustrate the longest possible carry sequence. During the seventh bit time the number standing in the accumulator triggers 13–19 is 0101110 and a correction is required. At $B_\phi$ time, the A pulse switches the condition of trigger 15 to the 1 condition. At $B_\phi$ time, the R pulse switches the condition of the trigger 14 and this results in a sequence of carries that turns "off" triggers 15, 16, 17 and 18 and turns "on" trigger 19. The accumulator now contains the correct binary decimal number.

While there have been shown and described and pointed out the fundamental novel features of the invention as applied to the preferred embodiment, it will be understood that various omissions, substitutions and changes in the form and details of the device illustrated and its operation may be made by those skilled in the art without departing from the spirit of the invention. It is the intention, therefore, to be limited only as indicated by the scope of the following claims.

What is claimed is:

1. In a system for converting a plurality of binary input bits having individual weighted values to represent an input number in binary code, into a binary-decimal code representation of the input number; an accumulator, including a plurality of binary triggers, one for each ordinal position required to represent the binary coded input number in binary-decimal code, four of said triggers being grouped in a units order group, and additional ones of said triggers being grouped in a tens order group; means including a common distributor channel and sequentially operating gating means for entering each of the bits representing said input number into a different one of said binary triggers; normally inactive correction means settable to an active state; setting means adapted to sense the condition of said units order group triggers, including means operative after the entry of each bit into said units order group of triggers to sum up the weighted values of bits in said units order group, and to set said correction means to said active state whenever said sum is ten or greater; adjusting means controlled by said correcting means when set to the active state, to change the setting of certain ones of said triggers so that the entire set of said triggers represents, in binary-decimal code, the number represented by the binary coded bits which had been entered into said triggers when the correction means was set to the active state; means for resetting said correction means to the inactive state following each operation of said adjusting means; and means for resetting all of the triggers of said accumulator prior to the entry of the first bit of a new number to be converted.

2. A system as described in claim 1, wherein clock means are provided to control said gating means, said clock means being adapted to generate a chain of gate pulses, each synchronized with a related one of the binary input bits, said clock means being further adapted to generate a group of shorter pulses within the time period of each of said gate pulses, for controlling said adjusting means.

3. A system as described in claim 2, wherein said adjusting means are controlled by one or more of said shorter pulses which occur early in the gate period following activation of said correction means.

4. A system as described in claim 3, wherein bits are delivered into said triggers from said common channel by a short pulse following the short pulses which control said adjusting means.

5. In a system for converting a binary coded input number composed of bits having individual weighted values of less than 10 and additional bits having individual weighted values of more than 10 into a binary-decimal code representation of the input number; an accumulator comprising a plurality of triggers, one for each ordinal position required to represent the binary coded input number in binary-decimal code, four of said triggers being grouped in a units order group and additional ones of said triggers being grouped in a tens order group; means including a common distributor channel into which the bits of said input number are fed in sequence and sequentially operating gating means, for delivering each bit of said input number from said channel into a different one of said triggers, said gating means including means for delivering each binary coded bit having a weighted value higher than 10 into the highest order trigger of the tens group which does not exceed the value of said last-mentioned binary coded bit; correction means; means for sensing the condition of the triggers of the units order group, said last means including means for summing up the weighted values of the bits delivered into the units order group of triggers and activating said correction means whenever the sum of the weighted values is 10 or greater; circuit means for feeding a bit pulse from said gating means having a weighted value higher than 10 to said correcting means to activate the latter; and means controlled by said correcting means, when activated, to change the settings of certain ones of said triggers so that the entire set of said triggers represents, in binary-decimal code, the number represented by the binary coded bits which had been delivered into said triggers when the correction means was activated.

6. A system as described in claim 5, wherein said correction means include two correction devices, one of which is activated by said sensing means or by a bit from the gating means which delivers a bit to the lowest order trigger of the tens order group, while the other is activated by a bit from the gating means which delivers a bit to the second order trigger of the tens order group.

References Cited by the Examiner

UNITED STATES PATENTS

| | | | |
|---|---|---|---|
| 2,860,327 | 11/1958 | Campbell ---------- | 340—347 |
| 3,021,065 | 2/1962 | Reynolds ---------- | 235—155 |
| 2,026,034 | 3/1962 | Couleur ------------ | 235—155 |

MALCOLM A. MORRISON, *Primary Examiner.*